W. B. HAHN.
LOADING AND UNLOADING MECHANISM FOR MIXING DRUMS OR OTHER RECEPTACLES.
APPLICATION FILED APR. 13, 1912.
1,063,159.
Patented May 27, 1913.
5 SHEETS—SHEET 1.
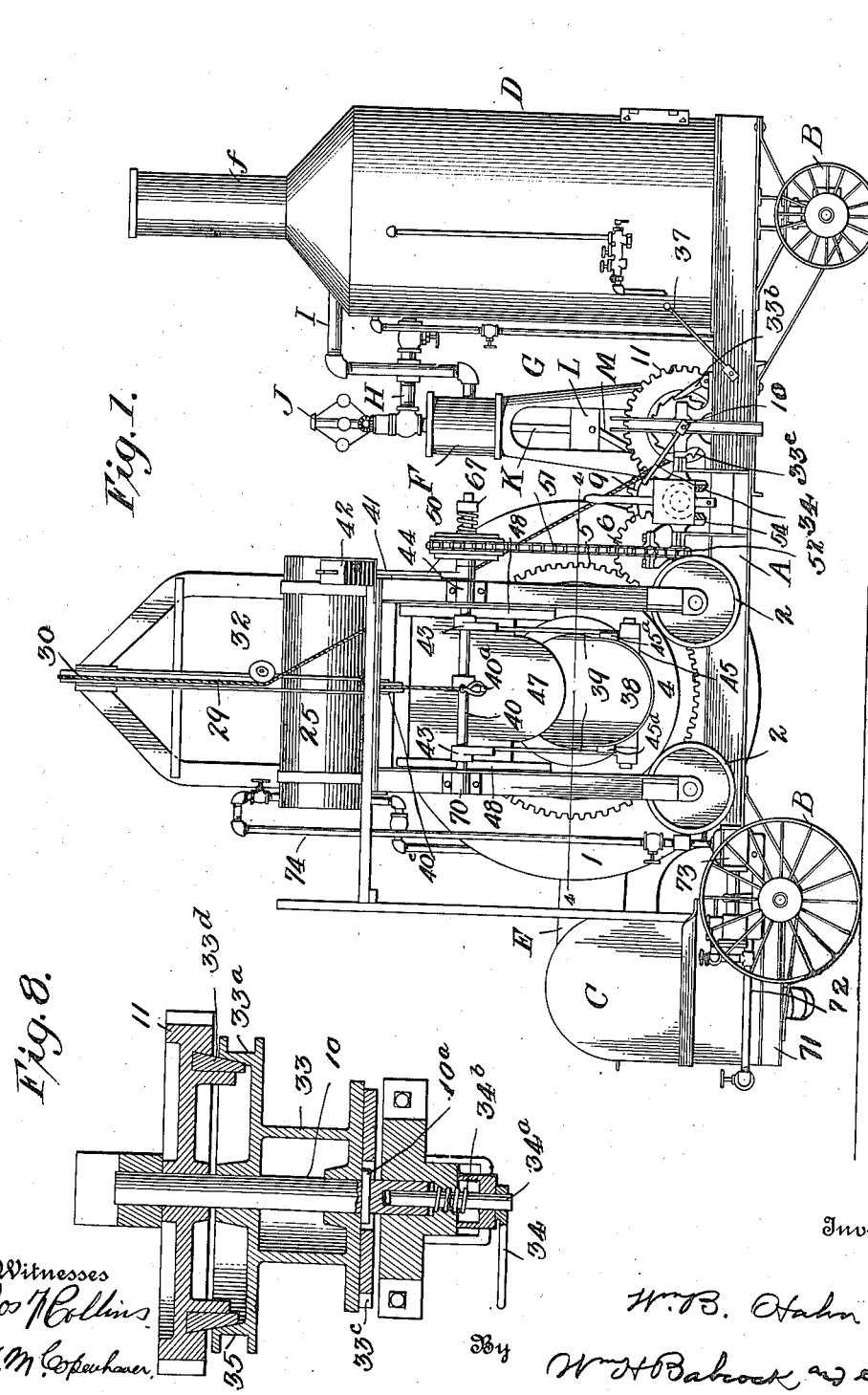

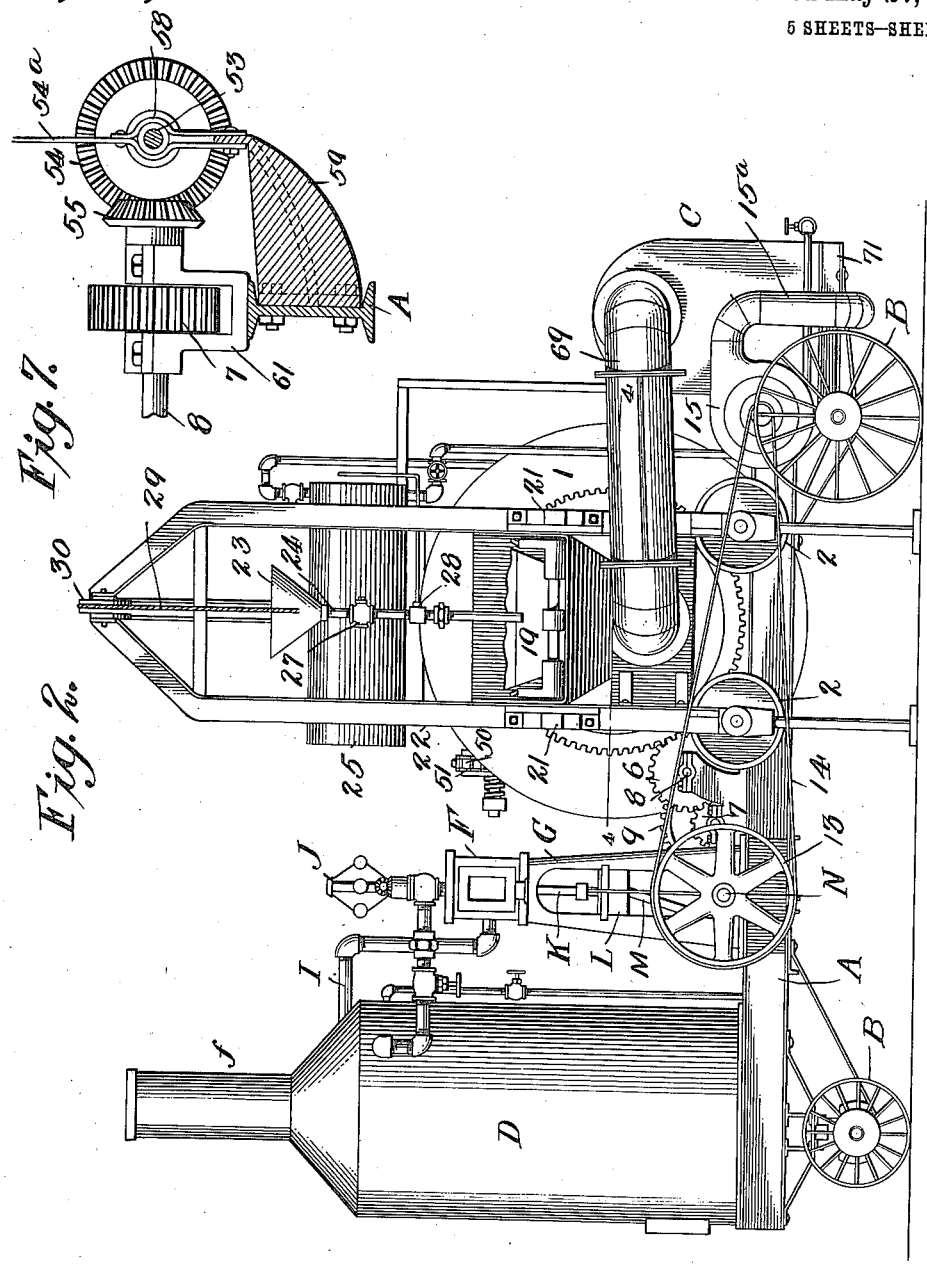

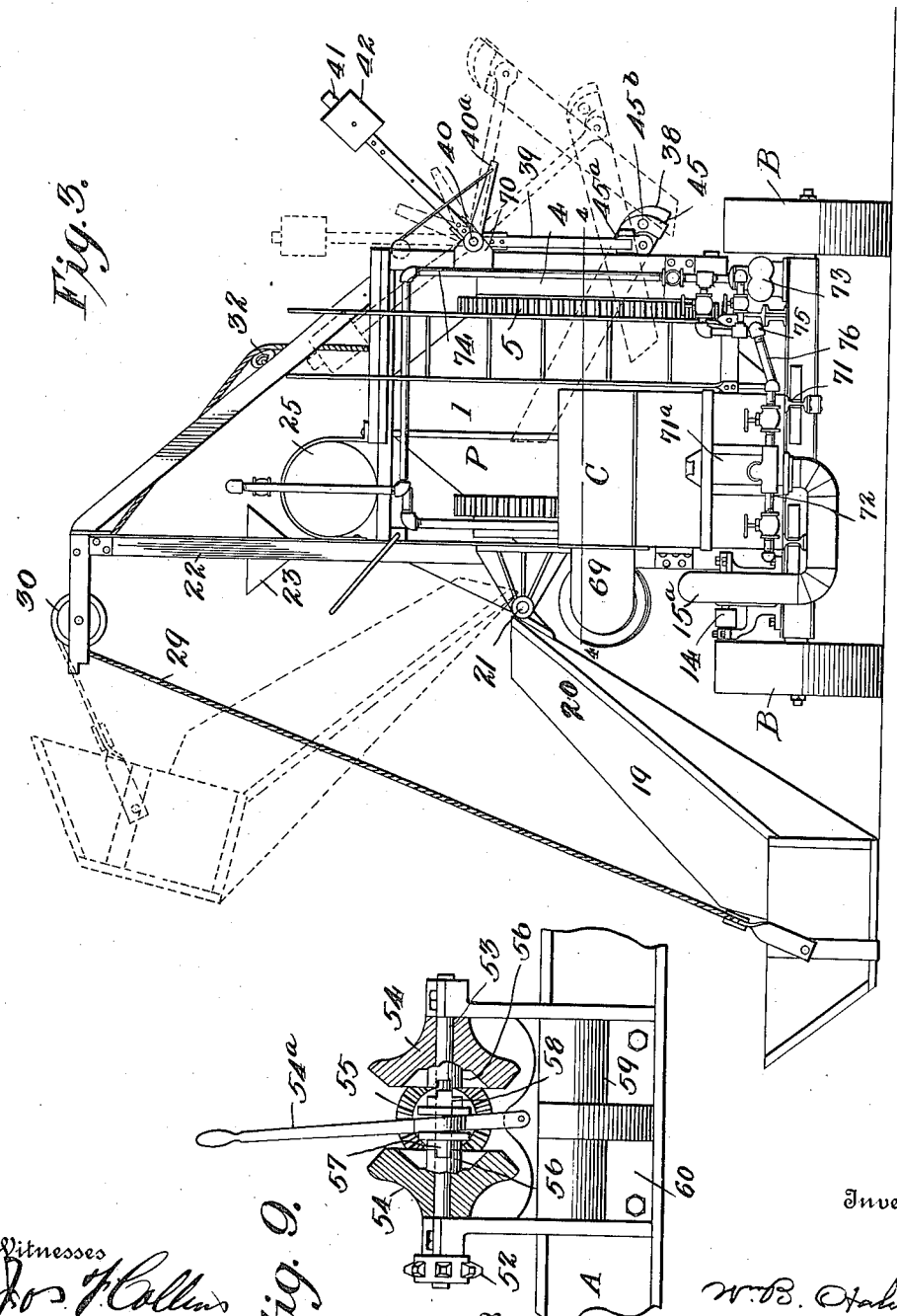

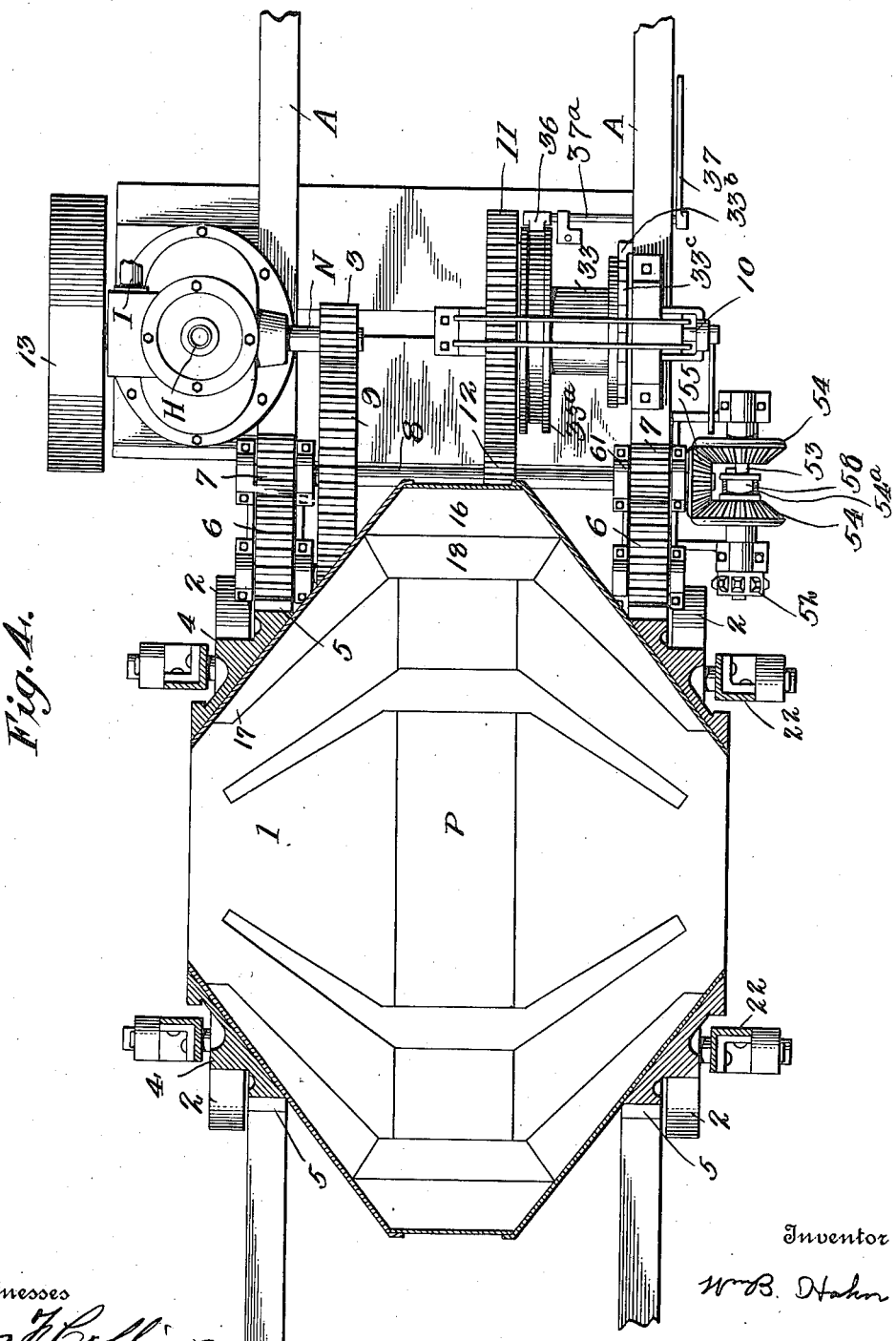

W. B. HAHN.
LOADING AND UNLOADING MECHANISM FOR MIXING DRUMS OR OTHER RECEPTACLES.
APPLICATION FILED APR. 13, 1912.
1,063,159.
Patented May 27, 1913.
5 SHEETS—SHEET 5.
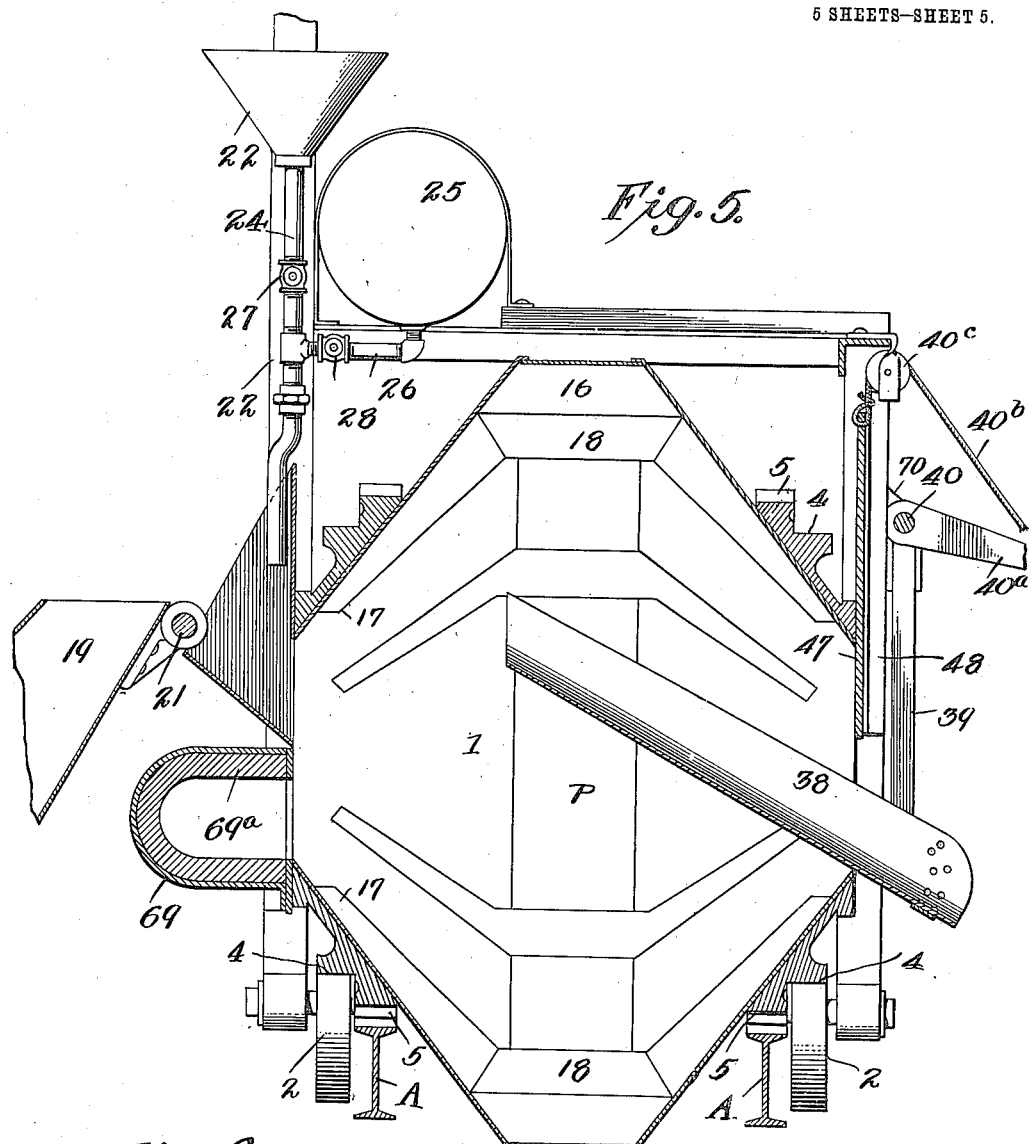
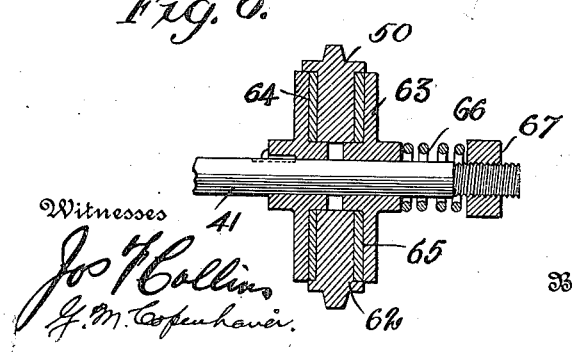
Witnesses
Jos H Collins
G. M. Copenhaver
Inventor
Wm B Hahn
By Wm H Babcock and Son
Attorney

UNITED STATES PATENT OFFICE.

WILLIAM BERTON HAHN, OF PARIS, TEXAS.

LOADING AND UNLOADING MECHANISM FOR MIXING-DRUMS OR OTHER RECEPTACLES.

1,063,159.   Specification of Letters Patent.   Patented May 27, 1913.

Application filed April 13, 1912. Serial No. 690,535.

*To all whom it may concern:*

Be it known that I, WILLIAM BERTON HAHN, a citizen of the United States, residing at Paris, in the county of Lamar and State of Texas, have invented certain new and useful Improvements in Loading and Unloading Mechanism for Mixing-Drums or other Receptacles, of which the following is a specification.

The chief purpose of this invention is to improve the practical working of asphalt and concrete mixers by regulating the alternate action of the loading and unloading mechanism and insuring its efficiency and certainty of action. It is, however, obviously applicable to other receptacles, arts and purposes.

To this end the said invention consists mainly in certain improvements in mechanism for operating the pivoted charging bucket; in certain improvements in mechanism for hanging and operating the discharging spout; in certain improvements in mechanism combining with the latter a cut-off suspending both the door and the spout from the same shaft and causing their alternate action and coöperation; in certain mechanism for combining the action of said spout and charging bucket in order that the driving shaft may throw them into operative position; in certain yielding adjustable mechanism whereby the movement of the discharge spout in one direction will automatically cease when a certain predetermined degree of strain is reached and in divers incidental features of improvement, all as hereinafter set forth and claimed.

In the accompanying drawings: Figure 1 represents a side elevation of a mixing machine embodying my invention; Fig. 2, a similar view of the other side of the machine, facing in the opposite direction; Fig. 3, an end elevation of the machine, illustrating the feeding and discharging operations, the charging bucket being shown in its upper and lower positions respectively in solid and dotted lines and the discharge spout being shown in three positions, position one in solid lines, the others in dotted lines; Fig. 4, a horizontal section on the line 4—4 of Figs. 1, 2 and 3; Fig. 5, a detail vertical central section on the mixing drum and of certain proximate parts, some of the latter being in elevation and other partly broken away; Fig. 6, a detail, central section of a sprocket wheel on the rock-shaft through which the discharge spout is operated; Fig. 7, some of the devices, partly in section and partly in elevation, for operating said rock-shaft from the counter-shaft of the engine; Fig. 8 represents in central section the clutch devices used in operating the feed spout; and Fig. 9, represents in detail, vertical section the rock-shaft operating clutch and bevel gears, shown in plan in Fig. 4 and partly in detail side elevation in Fig. 7.

A designates the truck frame of my portable concrete mixing and asphalt-heating and mixing mechanism carried by transporting wheels B.

In the complete machine as usually constructed a furnace C and boiler D are mounted on opposite sides of said truck, the former for supplying hot air, when desired, through a pipe E to the interior of the mixing drum I, the latter (D) for supplying steam through pipe H to an engine F having smoke stack $f$ and supported in frame G on said truck, said engine being provided with the usual governor J, piston rod K, cross-head L and pitman M, the latter connected by crank O to the driving shaft of the machine. Said drum is of the ordinary double conoidal form having a broad cylindrical middle part and provided with annular tracks 4 whereby it turns two pairs of wheels 2 mounted at fixed points of the said truck. Said drum also has a pair of cog-wheels 5 driven by said driving shaft, suitable gearing which may consist for example of gear-wheel 9 and pinions 7 on shaft 8 and the connecting gears 3 and 6. A counter shaft 10 and its gear wheel 11 are driven by an additional pinion 12 on said shaft 8. The fly-wheel 13 of shaft N is also a belt wheel, being utilized to drive a draft fan 15 when the air is to be forced through pipe E. The drum has as usual an internal series of buckets or stirrers 16. The construction of said drum is not claimed in the present application, nor are any of the heating or power-supplying devices, but it has been thought best to show the machine as a whole that the coöperation of the subject matter claimed may appear.

The sand is delivered into the receiving end of the mixing drum by means of a tilting charging-bucket 19 having an elongated tapering spout 20, which is pivoted at its discharging end to brackets 21 on a fixed part of the frame 22 at such a height and such a position that when said charging bucket is raised until the said spout inclines downward the sand or other material will be discharged from said bucket through said spout into said drum, as shown in Fig. 3. The crude asphalt or any substituted tarry substance is supplied through a hopper 23 and an upright pipe 24 (Figs. 2, and 5) to said drum at the same charging end. This pipe also receives water and oil or either of these liquids alone as preferred, from a combination water and oil tank 25 and its branch pipe 26 connected to pipe 24, said tank being located on top of frame 22 over the drum P. Hand operated check valves 27 and 28 control the downward flow of these materials through said pipes at all points above their junction in order that the proportions of the asphalt and the oil and water or both and also the total supply may be varied at will. The asphalt or similar substituted material is often found too heavy to yield the best results and therefore it is diluted by these lighter and more freely moving materials, which also supply ingredients often useful in concrete.

A cable 29 attached to the main body of the charging bucket 19 passes over a pulley 30 (Figs. 1, 2 and 3) on the highest point of the main frame 22 aforesaid, and thence down in contact with a guide-pulley 32 also mounted on said frame, to a winding drum 33 on the counter-driving shaft 10, so that as the latter turns the cable will be continuously wound and the charging bucket lifted as set forth, until it reaches the inverted charging position above stated. There is a conoidal clutch engagement between a flanged disk 33$^a$ integral with said winding drum 33, which is normally free on said countershaft, but held against turning by a pawl 33$^b$ which engages a ratchet wheel 33$^c$ fast to said disk 33$^a$, and a complementary clutch disk 33$^d$ turning with said shaft 10. The said shaft is provided with a crank handle 34 and rod 34$^a$, which acts as a shifting lever; said rod being provided with screw-threads 34$^b$ engaging similar fixed threads in the bearing of said shaft 10. Said rod 34$^a$ extends into the recessed end of said shaft 10, being adapted to abut against the end of said recess. A pin 10$^a$ passes transversely through said shaft and is adapted to engage the side of said disk 33. To lock said clutch disks the rod is turned in and forces said shaft 10, and said disk 33$^a$ through pin 10$^a$, laterally inward. To allow them to separate the rod 34$^a$ is turned outward. Thus the drum 33 is freed or locked at will, according to the direction in which said rod 34$^a$ is turned. Such release, and the disengagement by hand of pawl 33$^b$ from ratchet 33$^c$ permits the descent of said charging bucket. The annular flange of disk 33$^a$ has a circular periphery 35 and receives a brake band 36 operated by a brake lever 37 and crank-shaft 37$^a$ (Fig. 4) to ease the descent of said bucket.

The mixing drum P discharges through a swinging inserted discharge spout 38, hung at its outer end by pivot studs, hereinafter mentioned, on the lower end of a pair of arms 39, depending from a rock-shaft 40 (Figs. 1, 3 and 5) and moving therewith. Said rock-shaft has another arm 41 carrying a weight 42, which tends, when in the position shown in full lines, Fig. 3, to hold said arms 39 in vertical downward position. Said weighted arm may, however, be turned up into a vertical position when its action will be neutral, or over in a position of inclination the reverse of that shown in full lines as above, when its action would be the reverse of that stated and would tend to support the discharge spout in its outer and upper position. These positions are shown in dotted lines in Fig. 3. The bearings 43 of said shaft are attached to a fixed part 44 of the machine frame.

In proximity to the lower end of said arms the said spout is provided with a stirrup-form or semi-circular casting 45 extending around the end of said spout and fixed thereto. On its sides a pair of lugs or bosses are cast as bases for integral lateral pivot studs 45$^a$, which enter eyes in the lower ends of arms 39 and constitute swinging pivotal bearings for discharge spout 38.

While the contents of the drum are being heated and said drum is not yet ready to discharge, a door 47 closes the discharge aperture. This door slides down in fixed guideways 48 across said opening, for that purpose being lowered by means of a small arm 40$^a$ attached to the rock-shaft 40 (Figs. 1 and 5) and a cable 40$^b$ attached to said arm and passing over a pulley attached to the main frame, thence down to the door 47 (Fig. 5) in such a position and in such a manner that when the rock-shaft is rocked the door will be operated as above stated. To effect the operation of said discharge spout 38, a sprocket wheel 50 is mounted on said rock-shaft 40 to turn therewith, which sprocket wheel is connected by an endless chain 51 (Fig. 1) with a sprocket wheel 52 on shaft 8 aforesaid, which bears a bevel gear 55 at its end. A short shaft 53 (Fig. 4) at right angles to shaft 8 is provided with a pair of bevel gears 54 normally loose on their shaft and always in contact with said bevel gear wheel 55 on opposite sides thereof. Each of these bevel gears 54 is provided with a clutch face 56 adapted to be engaged by a similar opposing face 57 on the end of a sleeve 58 splined on the center part of said shaft 53, said sleeve being operated normally by a shifting lever 54$^a$ (Fig. 7), the operation of which causes said sleeve to slide on said shaft and engage one or the other of the faces 56 as above stated, thus reversing the rotary motion of shafts 53 and 40 for the purpose stated.

The bearings of shaft 53 are supported on a curved bracket arm 59, which is bolted at the other end to a fixed part 60 of the machine frame, which also supports the bifurcated bearing 61 of the proximate end of the shaft 8.

The upper sprocket wheel is not in one piece, but consists of three disks. The middle one 62 is provided with the sprocket cogs and its peripheral part overlaps at the sides the smooth peripheral faces of the other disks 63 and 64, covering also intervening frictional washers of leather or equivalent material 65. Disk 63 is fixed on the shaft 40, but disk 64 is splined on the end of said shaft and pressed against said middle disk 62 by a spring 66, the resilient action of which is regulated by a nut 67 on screw-threads on the end of said shaft. The middle disk 62 of this sprocket wheel is free on the shaft 40, except as it is held by the friction of the said disks 63 and 64 and the intervening washers, the amount of friction being governed as above stated. Consequently the sprocket and chain connection between shafts 8 and 40 will yield under a predetermined strain, which is set just sufficient to draw the discharge spout 38 out of the drum P to allow a batch of material to be mixed and then to throw it into the drum when the batch is ready to be discharged, which operation is effected by the shifting of the lever 54$^a$ as above stated. A stop 45$^a$ on casting 45 prevents the discharge spout from turning downward too far on its pivots as it withdraws from the drum P and holds it in proper position to reënter the same when the door is opened. A handle 45$^b$ also on the side of said casting is used in aiding this movement of said spout to insure perfect accuracy of entrance and withdrawal by tilting said spout on its pivot. Two brackets 70 of cast iron riveted to the machine frame as shown provide bearings for the rock-shaft 40 and also sustain the weight of the discharge spout 38, as the arms 39 are fastened to the rock-shaft 40, as above stated.

A pipe 69 (Fig. 2) of proper refractory material conveys the gaseous products of combustion from the furnace C to the mixing drum P, said pipe being lined with asbestos cement 69$^a$ or some other noncombustible material. Said gases are forced through pipe 69 by a fan pipe 15$^a$ connected to the draft fan 15 and connected at the other end to the bottom of furnace C, said fan being driven by the belt 14 running over the fly wheel 13 as hereinbefore stated. The furnace C is needed whenever it is necessary to subject the bituminous mixture to intense heat for thoroughly combining the ingredients. But this is not necessary in producing concrete and some other paving mixtures. If desired the furnace C may then be advantageously removed or left on the main frame as desired. To permit this it is mounted on a frame or platform of its own and detachable at 71 from the main frame.

The operation of the machine is as follows: The engine being started, the mixing drum is driven, through the connections stated, in regular rotation, and the sand or rock or sand and rock or the natural rock asphalt is automatically dumped into the mixing drum by the charging bucket, while the liquid asphalt or any substitute is allowed to flow down in hand regulated proportions and total quantity through the pipes hereinbefore mentioned, and the heated gases are forced into the drum by the fan and act on these ingredients, if such heating be needed. The mixing buckets, by their action while rotating, convert said ingredients into a plastic mass; when the mixture is ready to be discharged, the lever 54$^a$ is shifted and the shaft 40 is then acted on by means of the endless chain 51, which action causes the discharge spout to be inserted into the drum. The same action raises the door 47 and allows the contents of the drum to run out into any receptacle or onto the ground, through the discharge spout. When enough of the ingredients have run out, or it is necessary to reheat it, or there is occasion to recharge the drum, the lever 54$^a$ is again shifted and the discharge spout is withdrawn from the drum and the door drops down and closes the axial opening of the drum, holding the heat when heating asphalt and preventing the concrete from slopping out when mixing the same. The charging bucket will be automatically operated at regular intervals if the winding drum or pulley 33 be alternately engaged and disengaged by its shifting lever and clutch aforesaid so as to alternately tilt the said charging bucket for emptying, and return it to its normal position.

As I do not in the present application claim any specific features of the boiler, engine or furnace, it is unnecessary to minutely describe all their external features which are incidentally shown. The furnace may have a hydrocarbon burner 71 supplied through a pipe 72 by a pump 73 which draws through a pipe 74 from the oil tank 25 or any other suitable source of supply. This pipe may be supplied with steam from the exhaust pipe 75 of the engine and may exhaust through pipe 76, or it may be operated in any other convenient manner. The boiler has also the needed water supply pipe and waste pipe and all these pipes are provided with valves where needed.

Having thus described my invention, what I claim as new and desire to secure by Letters Patent is:

1. In discharging mechanism, a discharge spout therefor, pendant arms by which said spout is suspended, a rock-shaft from which said arms depend, gearing for rotating the said rock-shaft and reversing clutch devices for said gearing, whereby the direction of rotation of said shaft may be regulated at will, thereby mechanically swinging said spout alternately into and out of discharging position substantially as set forth.

2. In combination with a pivoted charging bucket and a pivoted discharging spout, an intermediate receptacle supplied by the former and discharging through the latter, a driving shaft and connections, distinct from said receptacle, between said shaft and bucket and said shaft and spout, said connections being arranged and adapted to alternately move the bucket into operative position while moving the spout into inoperative position and vice versa.

3. In combination with a pivoted charging bucket and a discharging spout, an intermediate receptacle supplied by the said bucket and discharging through said spout, pivoted suspending means to which said spout is pivoted outside of said receptacle in order that said spout may be swung toward or from the receptacle in reversing its own position of inclination, a driving shaft, intermediate connections distinct from said receptacle and including flexible connections respectively between said shaft and bucket and between said bucket and spout, and devices for permitting the reverse movement of the last mentioned parts, in order that the bucket and spout may alternately take their operative positions as set forth.

4. In discharging mechanism, a discharge spout, in combination with a weighted rock-shaft provided with depending arms on which said spout is pivoted to swing as described, a rotating shaft, mechanism for driving the same, and gearing between said shafts comprising a gear wheel composed of disks held together in frictional contact by a spring which will yield under a predetermined strain substantially as set forth.

5. In combination with a suspended door and a swinging spout arranged to pass below it when said door is raised, a rock-shaft, devices for suspending said door from said shaft and causing it to rise and fall with the rocking of the latter and additional devices for suspending said spout from said rock-shaft and causing said spout to swing alternately inward and outward with reversal of its position of inclination, simultaneously with the rising and falling of said door.

6. In combination with a vertically movable suspended door, a swinging discharge spout hung for movement into and out of discharging position as the said door ascends and descends, a rock-shaft provided with arms to which said spout is pivoted and with an additional arm for suspending said door, a flexible connection between the latter arm and said door and mechanism for operating said rock-shaft, including a gear wheel composed of disks held in frictional contact by a spring, in order that it may yield under a predetermined strain substantially as set forth.

7. A swinging discharge spout provided with a stirrup-form casting 45 which is fixed on the outer end of said spout, said casting having bosses on its sides and pivot studs extending laterally therefrom, in combination with a hand lever attached to said casting, a pair of depending arms, provided with eyes which afford bearings for said pivot studs, a rock-shaft on which said arms are mounted to move therewith, and means for actuating said rock-shaft for the alternate movements of said spout.

8. In discharging mechanism, a swinging discharge spout hung to be moved into discharging position and withdrawn therefrom, a suspended door for cutting off discharge as the spout thus withdraws and permitting discharge as the spout moves into its operative position, a rock-shaft provided with arms and means for suspending said spout and door therefrom, a weight on said shaft tending to turn it in one direction and mechanism for turning it in the other direction, said mechanism comprising a gear wheel composed of spring pressed frictional parts adapted to yield under strain and provided with means for regulating the spring pressure in order to determine the point at which the weight shall overcome the frictional resistance of the wheel for the purpose set forth.

9. A pivoted charging bucket, in combination with a cable and winding drum for raising the free end of said bucket to discharge the same, a shaft on which said drum is freely mounted, mechanism for driving said drum, a clutch disk turning with said drum and having an annular flange, a rake-band arranged for contact with said flange, a lever for applying said brake-band to said flange, a clutch disk turning with said shaft and means for bringing said clutch disks into engagement or separating them, the first mentioned disk thereby aiding both in the clutching and braking operations.

In testimony whereof I affix my signature in presence of two witnesses.

WILLIAM BERTON HAHN.

Witnesses:
  W. F. MOORE,
  CHAS. ROACH.